United States Patent [19]
Merkel

[11] Patent Number: 6,137,676
[45] Date of Patent: Oct. 24, 2000

[54] COLLAPSIBLE KEYBOARD MECHANISM WITH INTEGRATED LCD DISPLAY

[75] Inventor: Harold S. Merkel, Houston, Tex.

[73] Assignee: Compaq Computer Corporation, Houston, Tex.

[21] Appl. No.: 09/083,795

[22] Filed: May 22, 1998

[51] Int. Cl.[7] ............................... G06F 1/16; B41J 11/56
[52] U.S. Cl. .......................................... 361/680; 400/682
[58] Field of Search ............................ 361/680; 400/479, 400/488, 490–492, 682; 200/5 A, 344, 345

[56] References Cited

U.S. PATENT DOCUMENTS

| | | | |
|---|---|---|---|
| 5,532,904 | 7/1996 | Sellers | 361/680 |
| 5,587,875 | 12/1996 | Sellers | 361/680 |
| 5,602,715 | 2/1997 | Lempicki et al. | 361/680 |
| 5,654,872 | 8/1997 | Sellers | 361/680 |
| 5,677,826 | 10/1997 | Sellers | 361/680 |
| 5,768,094 | 6/1998 | Merkel | 361/680 |
| 5,790,370 | 8/1998 | Merkel | 361/680 |
| 5,933,320 | 8/1999 | Malhi | 361/680 |

*Primary Examiner*—Lynn D. Feild

[57] ABSTRACT

A notebook computer has a collapsible keyboard in which elastomeric key switch domes on the top side of a dome sheet are horizontally shiftable under the keys to selectively underlie and support them for use, or to permit the keys to be collapsed to depressed positions to reduce the thickness of the keyboard in its storage and transport orientation. When the computer display housing lid is closed it contacts and pivotally depresses a small LCD status display structure supported on the top side of the computer base housing rearwardly of the keyboard and linked to the dome sheet in a manner such that the dome sheet is responsively shifted to collapse the keys. When the display housing lid is subsequently opened and disengaged from the LCD status display structure, the LCD status display structure is spring-returned to its original elevated position to responsively shift the dome sheet in a manner causing the elastomeric domes to again underlie and resiliently support the keys in their elevated operating positions.

32 Claims, 2 Drawing Sheets

COLLAPSIBLE KEYBOARD MECHANISM WITH INTEGRATED LCD DISPLAY

BACKGROUND OF THE INVENTION

1. Field of the Invention

The present invention generally relates to computer apparatus and, in a preferred embodiment thereof, more particularly relates to keyboard structures for portable computers such as notebook computers.

2. Description of Related Art

In recent years the notebook computer has made considerable gains in both popularity and sophistication. One factor contributing to the increasing popularity of the notebook computer is its ever decreasing size and weight, a factor arising from the ability to fabricate various components of the computer in smaller and smaller sizes while, in many cases, increasing the power and/or operating speed of such components.

One continuing challenge in the design of notebook computers, however, is their keyboard structure. This design challenge arises from two conflicting design goals—the desire to even further reduce the size of the keyboard structure, and the desirability of having he notebook computer emulate as closely as possible the size and typing "feel" of a desktop computer keyboard.

There are, of course, two dimensional factors which may be varied to reduce the size of a notebook computer keyboard structure—its horizontal dimensions (i.e., its length and width), and its vertical or thickness dimension. The horizontal dimensions of the keyboard are governed by the number, size, and relative spacing of the manually depressible key cap portions of the keyboard, and various reductions in these three dimensional factors may be utilized to reduce the overall length and/or width of the keyboard. However, as will be readily appreciated, a reduction in these three configurational aspects to gain a keyboard size reduction correspondingly lessens he similarity of the notebook computer keyboard in appearance, key arrangement and typing feel to its desktop counterpart.

Similar restraints are also presented when attempts are made to reduce the overall thickness of a notebook computer keyboard. One possibility which has been investigated and attempted is to simply reduce the keystroke distance in the notebook computer keyboard compared to its desktop counterpart. Using this design technique, the overall thickness of the notebook computer in its closed storage and transport orientation may be correspondingly reduced. However, this thickness reduction in the overall notebook computer, achieved by reducing the keyboard keystroke distance, creates what many users consider to be an undesirable typing "feel" difference compared to the longer keystroke distance typically found in a larger desktop computer keyboard.

Another keyboard-directed approach to reducing the vertical thickness of a notebook computer in its closed storage and transport orientation is to provide a notebook computer keyboard with a collapsible construction in which, with the computer display screen lid opened, the keyboard keys are elevated to their normal operative positions, and with the display screen closed, the keys collapsed to reduce the thickness of the keyboard when the notebook computer is in its closed storage and transport orientation. Examples of collapsible notebook computer keyboards may be found in U.S. Pat. No. 5,532,904 to Sellers, and U.S. Pat. No. 5,602,715 to Lempicki et al, these patents being hereby incorporated by reference herein in their entirety.

In the collapsible notebook computer keyboards illustrated and described in these two patents, a dome sheet having a spaced series of elastomeric spring return domes underlies the keyboard's depressible key cap members which are supported on a monoblock structure, by scissor linkages, for vertical movement between extended and depressed positions. The dome sheet is shiftable relative to the keys between a first position in which the domes centrally underlie the keys and support them in elevated operating positions, and a second position in which the domes are horizontally shifted out of operative engagement with the keys and permit them to collapse toward the dome sheet to reduced height storage and transport orientations that correspondingly reduce the height of the keyboard.

A spring structure continuously exerts a horizontal biasing force on the dome sheet (either directly on the dome sheet or on the multi-layer circuit structure of which it is a part) which resiliently urges it toward its first position. When the notebook computer display screen lid is opened, the spring structure drives the dome sheet to its first position. Subsequently, when the display screen lid is closed, a structure on the lid engages an edge portion of the dome sheet (or the multi-layer circuit structure) and exerts a direct horizontal force thereon to shift it back to its second position.

While these two mechanisms for automatically collapsing a notebook computer keyboard in response to closing the computer's display screen lid portion advantageously reduce the overall keyboard thickness when the computer is in its closed storage and transport orientation, they also present several design difficulties. For example, it has proven to be somewhat difficult to meet the key collapse and elevation shifting motion tolerances required by the keyboard. Additionally, in these designs springs undesirably place several parts in stress over large areas thereof for extended time periods. Moreover, these designs undesirably require the computer to house mechanisms mechanically linking the lid housing to the shiftable portion of the keyboard.

In view of the foregoing it can be seen that a need exists for a collapsible notebook computer keyboard design which eliminates or at least substantially reduces the above identified design problems presented by previously proposed collapsible keyboard design. It is to this need which the present invention is directed.

SUMMARY OF THE INVENTION

In carrying out principles of the present invention, in accordance with a preferred embodiment thereof, a collapsible keyboard is incorporated in an electronic device, representatively a notebook computer, having a base housing with a top side, and a lid structure which is carried on the base housing for pivotal movement relative thereto, via a hinge structure, between a closed position in which the lid structure extends across and covers the top side of the base housing, and an open position in which the lid structure is pivoted away from and exposes the top side of the base housing.

The collapsible keyboard is carried on the top side of the computer base housing and has a body portion on a top side of which a series of keys are carried for vertical movement between upwardly extended and downwardly depressed positions. A shifting structure is carried by the body portion and has a self-contained actuating portion which is (1) resiliently biased in an upward direction toward a first position in which the shifting structure is caused to resiliently support the keys in their extended positions, and (2)

downwardly movable from its first position in which the shifting structure is caused to permit the keys to collapse to their depressed positions.

As the computer lid structure is being closed, it engages the actuating portion of the shifting structure and pushes it downwardly from its first position to its second position, thereby causing the shifting structure to collapse the keys. Preferably, the actuating portion in its first position projects upwardly beyond the top side of the top side of the base housing so that is contacted and depressed by the computer lid structure as it pivotally approaches the top side of the base housing.

In a preferred embodiment of the collapsible keyboard, the shifting structure includes a dome sheet portion of a multi-layer circuit pad that underlies the keys and has a spaced series of elastomeric key return domes thereon which, when the dome sheet is horizontally shifted by the actuating portion, are shifted into and out of underlying supporting relationships with the keys. The actuating portion is preferably pivotally interconnected between the shifting structure and the body portion of the keyboard and illustratively includes an LCD status display device pivotally connected to the body portion, and a linking structure pivotally interconnected between the status display device and the shifting structure.

With the computer lid structure opened, a spring structure pivotally biases the LCD status display device, which is preferably disposed on a rear top side portion of the base housing, upwardly to a rearwardly and upwardly canted orientation above the top side of the base housing where the display device may be easily be seen by a user of the computer. As the lid structure is being closed, it engages and downwardly pivots the LCD status display device to thereby horizontally move the shifting structure and collapse the keys.

Since the shifting structure is self-contained within the keyboard, and is not physically linked to the computer lid or hinge structure, the collapsible keyboard provides a variety of advantages over previously proposed collapsible computer keyboard structures.

For example, due to this self-containment feature, there are minimal restrictions placed on the lid structure hinge design. Additionally, the geometry of the shifting structure provides for meeting the relatively tight tolerances required for positioning the dome sheet within the keyboard. Another advantage provided by use of this self-contained actuating mechanism is that the spring structure force is borne by only a few parts over a relatively small area of the keyboard. Importantly, the shiftable dome sheet is not under appreciable spring-induced stress when the computer lid structure is closed—often for long periods of time.

Furthermore, the self-contained shifting structure actuating portion provides a design which is favorable to an assembly method that allows the keyboard to be installed as the last part in the overall computer assembly operation. Additionally, the horizontal sliding distance for the dome sheet can be easily customized without imposing design changes on balance of the computer.

DETAILED DESCRIPTION

Figure 1:
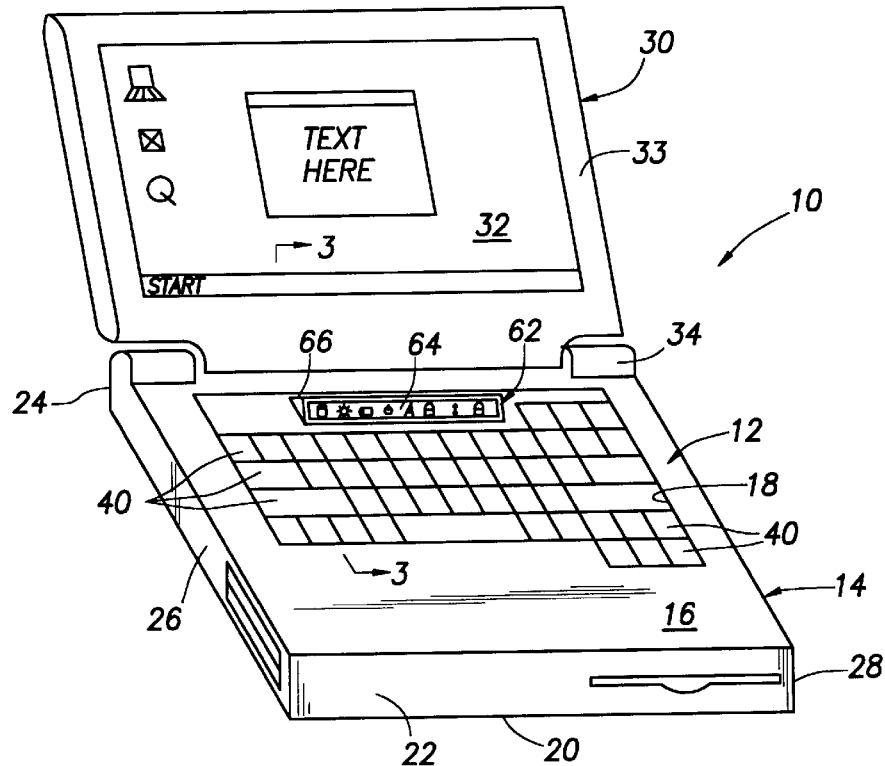
FIG. 1 is a highly simplified, somewhat schematic perspective view of a representative notebook computer shown in an opened orientation and incorporating therein a specially designed self-contained collapsible keyboard embodying principles of the present invention.
Figure 2:
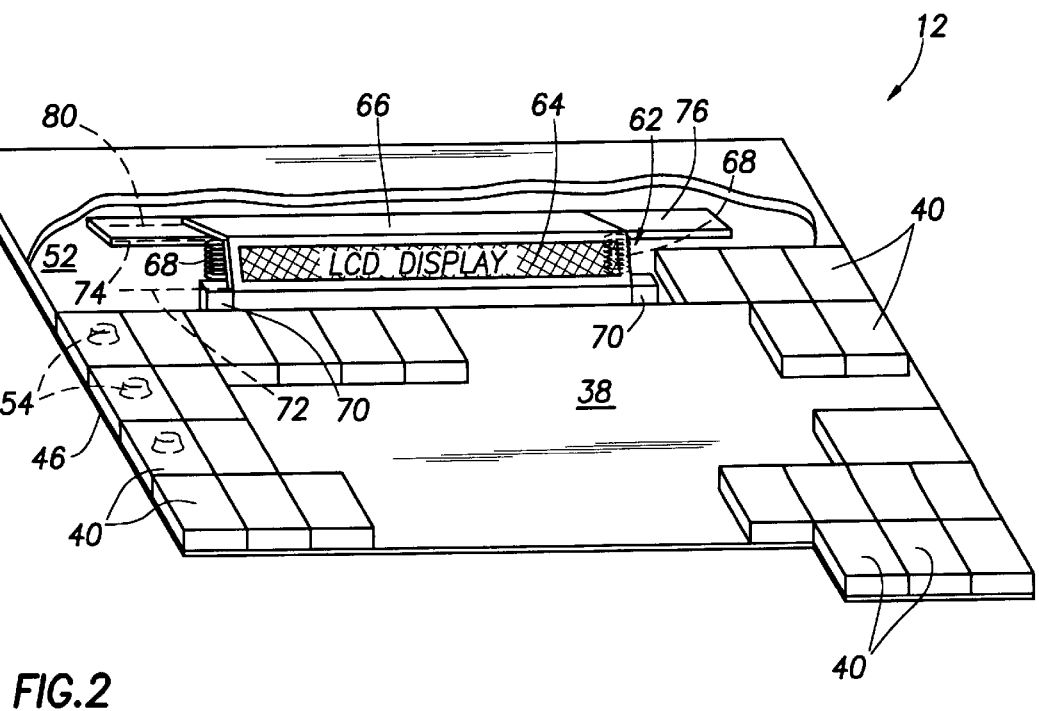
FIG. 2 is an enlarged scale simplified perspective view of the keyboard removed from the computer.

Referring initially to FIGS. 1 and 2, the present invention provides a portable computer, illustratively a notebook computer 10, having incorporated therein a specially designed collapsible keyboard structure 12 embodying principles of the present invention. Computer 10 includes a hollow rectangular base housing 14 having a top horizontal side wall 16 with an opening 18 therein; a bottom horizontal side wall 20; front and rear vertical side walls 22,24; and opposite left and right vertical end walls 26,28.

A hollow rectangular lid housing 30, having a display screen 32 on its front or inner side 33, is pivotally secured along a hinge joint 34 to a top rear corner portion of the base housing 14. Lid housing 30 may be upwardly pivoted to place the computer 10 in an open use orientation (see FIGS. 1 and 3) in which the top side 16 of the base housing 14 is exposed and the display screen 32 forwardly faces the user of the computer, or downwardly pivoted to place the computer 10 in a closed storage and transport orientation (see FIG. 3A) in which the lid housing 30 extends across and covers the top side 16 of the base housing 14. Suitable latch means (not shown) are provided to releasably retain the lid housing 30 in its FIG. 3A closed orientation.

Figure 3:
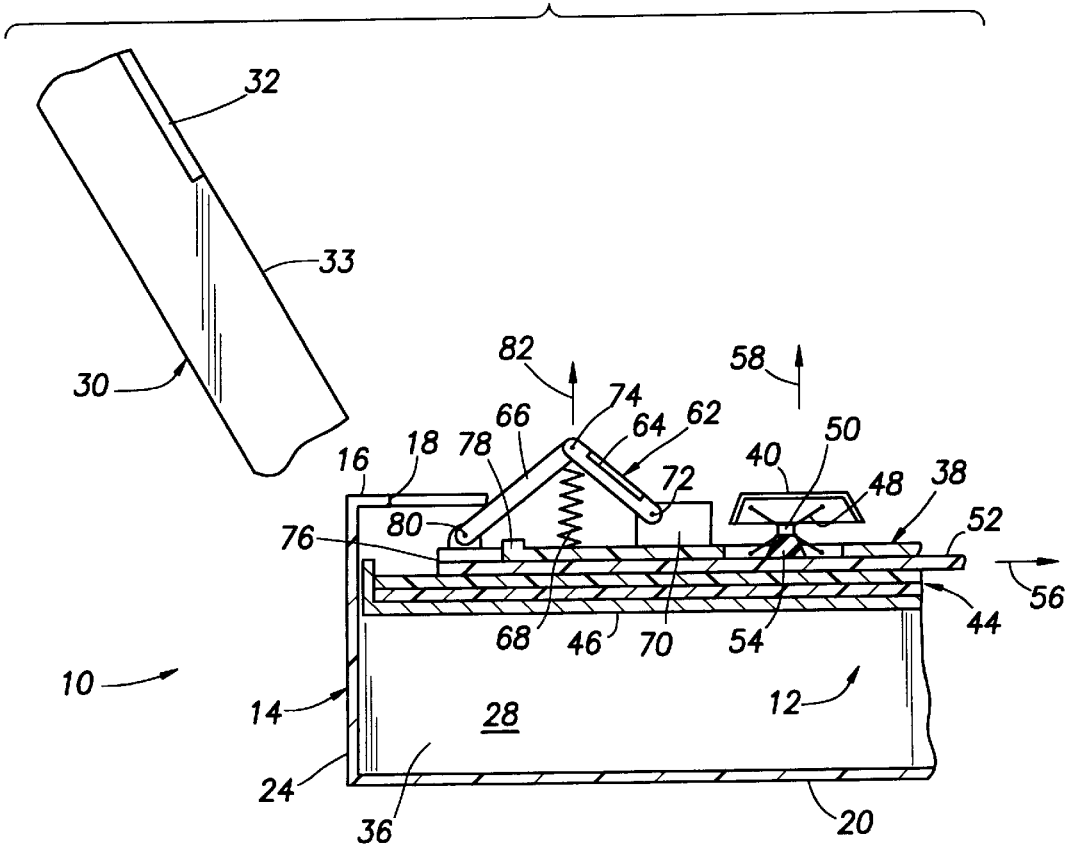
FIG. 3 is a schematic partial cross-sectional view through the computer taken generally along line 3—3 of FIG. 1.

The collapsible keyboard structure 12 extends across the opening 18 in the top side wall 16 of the base housing 14 and occupies only a relatively small upper portion of the interior 36 of the base housing. Referring now to FIGS. 1–3, the collapsible keyboard structure 12 basically comprises a relatively thin rectangular monoblock support structure 38 that horizontally extends across the base housing top side opening 18 and is suitably anchored to the base housing 14; a series of manually depressible key cap members 40 carried for vertical movement relative to the support structure 38 (as indicated by the arrow 42 in FIG. 3A) through a keystroke distance; and a rectangularly configured multilayer signal pad structure 44 that underlies the monoblock support structure 38 and is transverse to the keystroke directions 42.

Figure 3A:
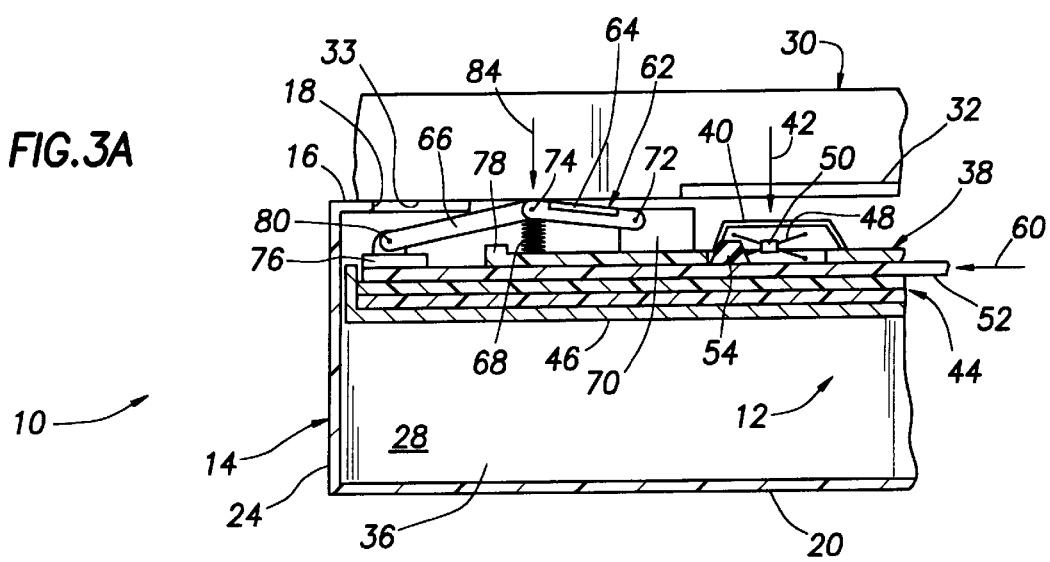
FIG. 3A is a partial cross-sectional view through the computer similar to that shown in FIG. 2, but with the computer in its closed position.

The multi-layer signal pad structure is supported on the top side of a metal base pan 46 and is schematically depicted in FIGS. 3 and 3A, with only three of its layers being shown for purposes of illustrative clarity. Signal pad structure 44 is similar to that illustrated and described in U.S. Pat. No. 5,602,715 to Lempicki et al which has been incorporated herein by reference. The monoblock structure 38 is suitably anchored to the base pan 46 and forms therewith a body portion of the keyboard structure 12 that movably carries its keys 40.

Key cap members 40 are mounted on the monoblock structure 38, for movement between a FIG. 3 upwardly extended operating position, and a FIG. 3A downwardly collapsed storage and transport orientation, by scissored support arm linkages 48 having central portions 50. The top layer of the multi-layer signal pad structure 44 is defined by a dome sheet 52 having secured to its top side a spaced series of elastomeric key return spring dome members 54 which generally underlie the key cap members 40. Dome sheet 52 is forwardly and rearwardly shiftable relative to the stationary balance of the multi-layer signal pad structure 44 and, in a manner similar to that shown in U.S. Pat. No. 5,602,715, is utilized to selectively elevate the keys 40 to and resiliently support them in their FIG. 3 extended operating positions, or cause the keys 40 to collapse to their FIG. 3A nonoperative collapsed storage and transport orientations.

More specifically, when the dome sheet 52 is shifted forwardly as indicated by the arrow 56 in FIG. 3, the domes 54 are shifted forwardly under the central portions 50 of the scissored arm linkages 48 and ramp them upwardly to drive the keys upwardly from their collapsed position to their FIG. 3 extended operating orientations as indicated by the arrow 58 in FIG. 3. In this key orientation, each key 40 is resiliently supported by one of the underlying domes 54. When the key is depressed, the central linkage portion 50 vertically deforms the underlying dome and causes a contact portion thereof to close a switch in the underlying signal pad structure 44 and responsively generate the appropriate keystroke signal. When the key is then released, the underlying dome 54 resiliently returns the depressed key 40 upwardly to its FIG. 3 extended operating orientation.

Similarly, when the dome sheet 52 is subsequently shifted rearwardly, as indicated by the arrow 60 in FIG. 3A, the domes 54 are horizontally moved out of engagement with the central portions 50 of the scissored arm linkages 48 and the keys 40 collapse back to their FIG. 3A positions as indicated by the arrow 42. The keys 40 may simply be allowed to collapse by gravity. However, the illustrated keys 40 are preferably driven downwardly to their collapsed orientations using projections on the top side of the dome sheet 52 (not shown) which forcibly engage and collapse the scissored arm linkages as illustrated and described in U.S. Pat. No. 5,602,715 to Lempicki et al.

In a unique manner representing a key aspect of the present invention, the forward shifting of the dome sheet 52, which causes the keys 40 be raised and resiliently supported by the elastomeric domes 54, is effected in response to the opening of the lid housing 30. Conversely, the rearward shifting of the dome sheet 52, which collapses the keys 40, is effected in response to closing the lid housing 30.

This selective raising and collapsing of the keys 40 in respective response to opening and closing the lid housing is achieved using a specially designed shifting structure which, in addition to the dome sheet 52, representatively includes an elongated rectangular LCD status display structure 62 having a screen portion 64 and being positioned rearwardly adjacent a central rear side portion of the key array, an elongated rectangular linkage plate 66, and a pair of coiled compression spring members 68.

As illustrated in FIGS. 2–3A, bottom front corner portions of the LCD status display structure 62 are pivotally connected to upstanding block portions 70 of the monoblock structure 38 to permit the display structure 62 to pivot relative to the stationary monoblock structure 38 about a horizontal axis 72. An upper rear side edge portion of the display structure 62 is pivotally connected to an upper front side edge portion of the linkage plate 66 to permit relative pivotal motion between the display structure 62 and the linkage plate 66 about a horizontal axis 74 parallel to and positioned rearwardly of the axis 72.

Bottom rear corner portions of the linkage plate 66 are pivotally connected to an elongated drive bar 76 anchored to a rear top side portion of the horizontally shiftable dome sheet 52 rearwardly of a stop projection portion 78 formed on the monoblock support structure 38. The linkage plate 66 is pivotable relative to the stationary monoblock structure 38 about a horizontal axis 80 extending parallel to and positioned rearwardly of the axis 74.

The springs 68 are vertically oriented and bear at their opposite ends on the top side of the monoblock structure 38 and the undersides of opposite upper corner portions of the pivotally interconnected LCD status display structure 62 and the linking plate 66. With the lid housing 30 in its opened position shown in FIGS. 1 and 3, the springs 68 resiliently bias the pivotally interconnected edge portions of display structure 62 and linkage plate 66 upwardly, as indicated by the arrow 82 in FIG. 3, in a manner causing the LCD status display structure screen 64 to be rearwardly and upwardly inclined at a convenient viewing angle for a user of the computer 10, and to upwardly project beyond the top side of the balance of the keyboard structure 12. This upward resilient biasing force exerted by the springs 68 pivotally urges the display structure 62 and the linkage plate 66 toward one another in a manner resiliently forcing the drive bar 76 forwardly against the monoblock stop projection 78 (see FIG. 3) and holding the dome sheet 52 in its rightwardly shifted orientation in which the domes 54 underlie and resiliently support the keys 40 in their upwardly extended operating orientations.

When the lid housing 30 is subsequently closed, a portion of the lid housing front side wall 33 below the lid housing screen 32 downwardly engages the juncture area between the LCD status display structure 62 and the linkage plate 66 and drives it downwardly, as indicated by the arrow 84 in FIG. 3A, to thereby pivot the display structure 62 in a counterclockwise direction (as viewed in FIG. 3A) relative to the monoblock portions 70, and pivot the linkage plate 66 in a clockwise direction relative to the display structure 62. As may be seen by comparing FIGS. 3 and 3A, this, in turn, forces the drive bar 76 rearwardly away from the monoblock structure stop projection 78, and rearwardly shifts the dome sheet 52, as indicated by the arrow 60 in FIG. 3A, thereby collapsing the keys 40 as indicated by the arrow 42. When the lid housing 30 is re-opened, the springs 68 pivotally force the display structure 62 and the linkage plate 66 upwardly back to their FIG. 3 positions which, in turn, forces the drive bar forwardly back into stopped abutment with the monoblock structure stop projection 78 and forwardly shifts the dome sheet 52 to re-elevate the keys 40 to their upwardly extended operating orientations.

A variety of modifications could be made to this shifting structure without departing from the principles of the present invention. For example, while the use of the LCD status display structure 62 as an integral portion of the key position control linkage positions the status display screen 64 at a convenient position and orientation for the computer user, it could be replaced, if desired, with another plain linkage member similar to the linkage plate 66.

Additionally, various other types of linkage biasing structures could be employed in place of the illustratively depicted spring members 68. For example, a leaf spring member could be vertically extended between the monoblock structure 38 and the juncture area between the LCD display structure 62 and the linkage plate 66. As yet another illustrative alternative, a horizontally oriented spring structure could be utilized to directly urge the drive bar 76 toward the monoblock structure stop projection 78.

Moreover, while the shifting structure of the present invention has been illustrated as being operative to forwardly shift the dome sheet 52 relative to the keys 40 in response to opening the lid housing 30 to elevate the keys 40, such shifting structure could be rearranged, if desired, to cause a rearward shifting of the dome sheet 52, which elevates the keys 40, in response to the opening of the lid housing 30. In this instance. the lower end of the LCD status display structure 62 could be pivotally connected to the dome sheet 52, with the rear side edge of the linkage plate 66 being pivotally connected to the monoblock structure 38 in a suitable manner.

Finally, while the shifting structure of the present invention has been illustrated as being operative to shift the dome sheet 52 relative to the balance of the multi-layer signal pad structure 44, it will be readily appreciated that if desired the entire pad structure 44 (along with the base pan 46) could be shifted relative to the monoblock structure 38 to effect the selective extension and collapsing of the keys 40 in respective response to the opening and closing of the lid housing 30.

It should be noted that the above-described shifting structure is self-contained within the keyboard structure 12, and is not physically linked to the lid housing 30 or the hinge structure 34. This provides the collapsible keyboard with a variety of advantages over previously proposed collapsible keyboard structures. For example, due to this self-containment feature, there are minimal restrictions placed on the display housing hinge design.

Additionally, the geometry of the shifting structure provides for meeting the relatively tight tolerances required for positioning the sliding dome sheet within the keyboard. When the keys 40 are elevated, the position of the drive bar 76 is determined by a positive physical stop (i.e., the monoblock structure stop portion 78) designed into the keyboard chassis. When the keys 40 are collapsed, the position of the drive bar 76 is controlled by the geometry of the shifting structure linkage (i.e., the pivotally interconnected display structure 62 and linkage plate 66).

This control is forgiving with respect to tolerance of depressing the status LCD display mechanism 62 by the computer lid housing 30. Due to the trigonometry of the linkage, small vertical movements result in correspondingly small horizontal movement of the drive bar 76. For example, in the representatively illustrated linkage, if the linkage plate 66 is 12 mm wide, 1 mm of vertical movement of the lid housing 30 results in only about 0.04 mm horizontal travel of the drive bar 76.

Another advantage provided by the above-described shifting structure is that the force exerted by the springs 68 is borne by only a few parts over a relatively small area of the keyboard. The drive bar 76, the dome sheet 52, etc. are not under appreciable stress when the lid housing 30 is closed—often for long periods of time. Moreover, this design is favorable to an assembly method that allows the keyboard 12 to be installed as the last part in the computer assembly. Additionally, the sliding distance for the dome sheet can be easily customized without imposing design changes on the balance of the computer.

The foregoing detailed description is to be clearly understood as being given by way of illustration and example only, the spirit and scope of the present invention being limited solely by the appended claims.

What is claimed is:

1. A collapsible keyboard comprising:
 a body portion;
 a series of keys carried on said body portion for movement relative thereto in a first direction between extended and depressed positions; and
 a shifting structure carried by said body portion and having an actuating portion which is (1) resiliently biased in said first direction toward a first position in which said shifting structure is caused to resiliently support said keys in said extended positions, and (2) movable in said first direction from said first position to a second position in which said shifting structure is caused to permit said keys to collapse from said extended positions to said depressed positions, said actuating portion being partially defined by a display structure pivotally secured to said body portion.

2. The collapsible keyboard of claim 1 wherein said collapsible keyboard is a computer keyboard.

3. The collapsible keyboard of claim 2 wherein said computer keyboard is a notebook computer keyboard.

4. The collapsible keyboard of claim 1 wherein:
 said body portion has a top side,
 said series of keys are positioned on said top side,
 said actuating portion is resiliently biased in an upward direction relative to said body portion, projects upwardly beyond said top side of said body portion when in said first position, and is downwardly movable from said first position to said second position.

5. The collapsible keyboard of claim 1 wherein:
 said shifting structure further includes a shiftable portion linked to said actuating portion and being shiftable in opposite directions transverse to said first direction, into and out of supporting engagement with said series of keys, in respective response to movement of said actuating portion to said first and second positions thereof.

6. The collapsible keyboard of claim 5 wherein:
 said series of keys are supported on said body portion by scissored arm linkages, and
 said shiftable portion includes a dome sheet having a spaced series of elastomeric domes disposed thereon and being releasably engageable with said scissored arm linkages.

7. A collapsible keyboard comprising:
 a body portion having a top side;
 a series of keys carried on said top side of said body portion for vertical movement relative thereto between extended and depressed positions;
 shifting means, carried by said body portion and being horizontally shiftable relative thereto between a first position in which said shifting means resiliently support said series of keys in said extended positions, and a second position in which said shifting means permit said series of keys to collapse to said depressed positions; and
 actuating means linked to said shifting means and being resiliently biased toward a first position in which said actuating means project upwardly beyond said top side of said body portion and move said shifting means to said first position thereof, and downwardly movable to a second position in which said actuating means move said shifting means to said second position thereof, said actuating means including a display structure secured to said body portion for pivotal motion relative thereto about a horizontal axis.

8. The collapsible keyboard of claim 7 wherein said collapsible keyboard is a computer keyboard.

9. The collapsible keyboard of claim 8 wherein said computer keyboard is a notebook computer keyboard.

10. The collapsible keyboard of claim 7 wherein:
 said shifting means include a dome sheet having, on a side thereof, a spaced series of elastomeric return spring dome members.

11. A collapsible portable computer keyboard comprising:
 a body portion having a top side;
 a series of keys carried on said top side of said body portion for vertical movement relative thereto between upwardly extended and downwardly depressed positions;

a shifting member having a spaced plurality of resilient key return spring members thereon, said shifting member being carried by said body portion for horizontal movement relative thereto between a first position in which said key return spring members underlie and resiliently support said keys in said upwardly extended positions, and a second position in which said key return spring members permit said keys to collapse to said downwardly depressed positions; and an actuating structure linked to said shifting member and being resiliently biased toward a first position in which said actuating structure projects upwardly beyond said top side of said body portion and moves said shifting member to its first position, said actuating structure being downwardly movable from its first position to a second position in which it operates to move said shifting member from said first position thereof to said second position thereof, said actuating structure including a display device.

12. The collapsible portable computer keyboard of claim 11 wherein said collapsible portable computer keyboard is a notebook computer keyboard.

13. The collapsible portable computer keyboard of claim 11 wherein said actuating structure is pivotally interconnected between said body portion and said shifting member.

14. The collapsible portable computer keyboard of claim 13 wherein said display device is an LCD status display device.

15. The collapsible portable computer keyboard of claim 13 wherein:

said display device is pivotally connected to one of said body portion and said shifting member, and said actuating structure includes a linking member pivotally interconnected between said display device and the other one of said body portion and said shifting member.

16. The collapsible portable computer keyboard of claim 11 wherein:

said shifting member is a dome sheet portion of a multi-layer circuit pad, and said key return spring members are elastomeric dome members.

17. An electronic device comprising:

a base housing having a top side;

a lid structure carried on said base housing for pivotal movement relative thereto between a closed position in which said lid structure extends across and covers said top side of said base housing, and an open position in which said lid structure is pivoted away from and exposes said top side of said base housing; and a collapsible keyboard carried on said top side of said base housing and including:

a body portion, a series of keys carried on said body portion for vertical movement relative thereto between extended and depressed positions, and a shifting structure carried by said body portion and having an actuating portion which is (1) resiliently biased in an upward direction toward a first position in which said shifting structure is caused to resiliently support said keys in said extended positions, and (2) engageable and downwardly movable by said lid structure, as it is being closed, from said first position to a second position in which said shifting structure is caused to permit said keys to collapse from said extended positions to said depressed positions, said actuating portion being partially defined by a display structure pivotally secured to said body portion.

18. The electronic device of claim 17 wherein said electronic device is a portable computer.

19. The electronic device of claim 18 wherein said portable computer is a notebook computer.

20. The electronic device of claim 17 wherein:

said body portion has a top side, said series of keys are positioned on said top side of said body portion, and said actuating portion, when in said first position thereof, and is downwardly movable from said first position thereof to said second position thereof.

21. The electronic device of claim 17 wherein:

said shifting structure further includes a shiftable portion linked to said actuating portion and being horizontally shiftable in opposite directions, into and out of supporting engagement with said series of keys, in respective response to movement of said actuating portion to said first and second positions thereof.

22. The electronic device of claim 21 wherein:

said series of keys are supported on said body portion by scissored arm linkages, and said shiftable portion includes a dome sheet having a spaced series of elastomeric domes disposed thereon and being releasably engageable with said scissored arm linkages.

23. An electronic device comprising:

a base housing having a top side;

a lid structure carried on said base housing for pivotal movement relative thereto between a closed position in which said lid structure extends across and covers said top side of said base housing, and an open position in which said lid structure is pivoted away from and exposes said top side of said base housing, and a collapsible keyboard carried on said top side of said base housing and including:

a body portion having a top side, a series of keys carried on said top side of said body portion for vertical movement relative thereto between extended and depressed positions, shifting means, carried by said body portion and being horizontally shiftable relative thereto between a first position in which said shifting means resiliently support said series of keys in said extended positions, and a second position in which said shifting means permit said series of keys to collapse to said depressed positions, and actuating means linked to said shifting means and being resiliently biased toward a first position in which said actuating means project upwardly beyond said top side of said body portion and move said shifting means to said first position thereof, and engageable and downwardly movable by said lid structure, as it is being closed, to a second position in which said actuating means move said shifting means to said second position thereof, said actuating means including a display structure secured to said body portion for pivotal motion relative thereto about a horizontal axis.

24. The electronic device of claim 23 wherein said electronic device is a portable computer.

25. The electronic device of claim 24 wherein said computer keyboard is a notebook computer keyboard.

26. The electronic device of claim 23 wherein:

said shifting means include a dome sheet having, on a side thereof, a spaced series of elastomeric return spring dome members.

27. A portable computer comprising:

a base housing having a top side;

a lid structure carried on said base housing for pivotal movement relative thereto between a closed position in which said lid structure extends across and covers said top side of said base housing, and an open position in which said lid structure is pivoted away from and exposes said top side of said base housing; and a collapsible keyboard carried on said top side of said base housing and including:
- a body portion having a top side,
- a series of keys carried on said top side of said body portion for vertical movement relative thereto between upwardly extended and downwardly depressed positions,
- a shifting member having a spaced plurality of resilient key return spring members thereon,
    - said shifting member being carried by said body portion for horizontal movement relative thereto between a first position in which said key return spring members underlie and resiliently support said keys in said upwardly extended positions, and a second position in which said key return spring members permit said keys to collapse to said downwardly depressed positions and
- an actuating structure linked to said shifting member and being resiliently biased toward a first position in which said actuating structure projects upwardly beyond said top side of said body portion and moves said shifting member to its first position, said actuating structure being downwardly movable from its first position to a second position in which it operates to move said shifting member from said first position thereof to said second position thereof, said actuating structure including a display device.

28. The portable computer of claim 27 wherein said portable computer is a notebook computer.

29. The portable computer of claim 27 wherein said actuating structure is pivotally interconnected between said body portion and said shifting member.

30. The portable computer of claim 27 wherein said display device is an LCD status display device.

31. The portable computer of claim 27 wherein:

said display device is pivotally connected to one of said body portion and said shifting member, and said actuating structure includes a linking member pivotally interconnected between said display device and the other one of said body portion and said shifting member.

32. The portable computer of claim 27 wherein:

said shifting member is a dome sheet portion of a multi-layer circuit pad, and said key return spring members are elastomeric dome members.

* * * * *